Sept. 3, 1957

A. MENDEZ 2,804,785

PLANETARY GEARING

Filed May 13, 1954

INVENTOR.
ALFRED MENDEZ,
BY
ATTORNEYS.

United States Patent Office 2,804,785
Patented Sept. 3, 1957

2,804,785

PLANETARY GEARING

Alfred Mendez, Indianapolis, Ind., assignor to Indiana Gear Works, Incorporated, Indianapolis, Ind., a corporation of Indiana Application May 13, 1954, Serial No. 429,518

7 Claims. (Cl. 74—801)

My invention deals with planetary gearing and has for its object the reduction of the maximum tooth-loading in a planetary gear-set of given over-all dimensions, speed ratio, and output torque.

My improved planetary gear-set, when used as a speed-reducer, embodies a driving element in the form of a sun gear, a driven element in the form of a planet-carrier, and an annular series of planet-clusters rotatably mounted in the carrier. Each planet-cluster comprises a pair of rigidly interconnected planet-pinions one of which meshes with the driving sun gear and the other of which meshes with a second sun gear, which is an idler. The planet carrier supports a second series of planet pinions each of which meshes with the idler sun gear and with a stationary ring gear.

The accompanying drawing illustrates the invention:

Figure 1:
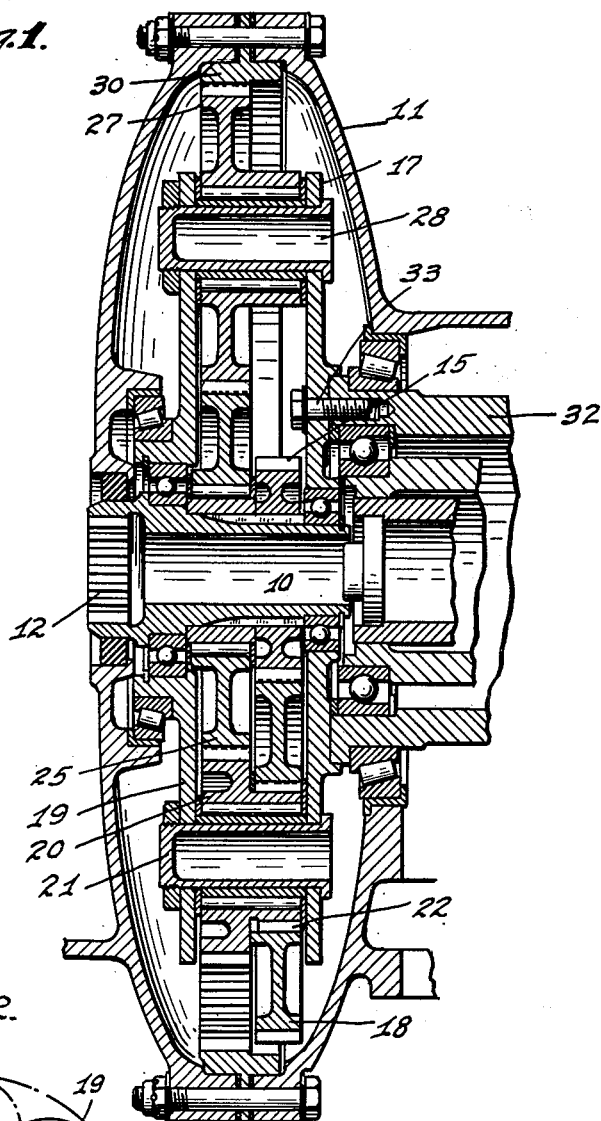
Fig. 1 is an axial section through a planetary gear-set.
Figure 2:
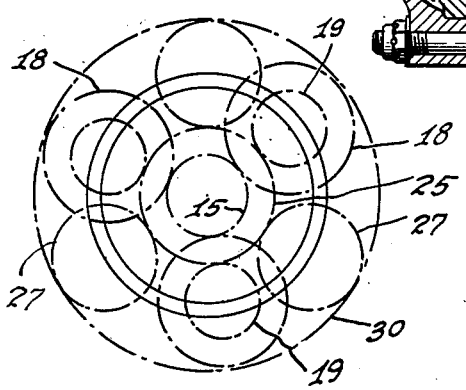
Fig. 2 is a diagrammatic elevation of the gear set shown in Fig. 1.

The gear-set shown in Fig. 1 is designed as a speed-reducing gear and includes an input shaft 10 rotatably mounted within an appropriate hollow housing 11. As shown, the input shaft 10 has at one end an annular series of internal clutch teeth 12 for connection to any appropriate driving means. Within the casing 11, I provide a sun gear 15 mounted on and splined or otherwise connected to the input shaft 10 for rotation therewith.

Arranged in the casing 11 for rotation about an axis coincident with that of the input shaft 10 is a planet carrier 17 which supports an annular series of planet-clusters each comprising a first pinion 18 meshing with the sun gear 15 and a second pinion 19 rigidly connected with and of smaller diameter than the first pinion. As shown, the pinion 18 of each planet-cluster has an integral hub 20 supported through an antifriction bearing from a pin 21 rigidly mounted in the planet carrier 17. The hub 20 projects axially beyond the pinion 19 into the pinion 18 and is provided with an external series of clutch teeth 22 meshing with an internal series of clutch teeth provided in the pinion 18.

In the plane of the planet pinions 19 there is provided a second sun gear 25, which is freely rotatable and serves merely as an idler meshing with the planet pinions 19 and providing a driving connection between such pinions and a series of idler planet pinions 27 rotatably supported from the planet carrier 19 through pins 28. The idler pinions 27 mesh with a stationary ring gear 30 secured to the casing 17.

In the gear set as above described, the driven element is the planet carrier 17, which is connected to an output shaft 32 as through the medium of screws 33.

The speed ratio provided by my gear-set is dependent upon the relative diameters of the driving sun gear 15, the two planet pinions 18 and 19, and the ring gear 30, and is independent of the diameters of the idler sun gear 25 and idler planet pinions 27. Although the idlers 25 and 27 have no effect on the speed ratio, their presence in the gear-set adds flexibility to the selection of practical diameters for the other gears. As an example of the benefits obtainable from such increase in flexibility of design, I cite a comparison between the gear set disclosed herein and a simple planetary gear set in which a single set of planet pinions interconnected the sun and ring gears. Both gear sets provided substantially the same speed reduction (about 9.1 to 1), both occupied the same space, and both had the same output torque, but the maximum tooth-tip compressive stress in my gear set was only about forty percent of that in the other.

I claim as my invention:

1. In a planetary gear-set, a pair of coaxial and independently rotatable sun gears of different diameter, a planet carrier rotatable relatively to both sun gears about their common axis, one or more planet clusters rotatably supported from said planet carrier, each of said clusters comprising two rigidly interconnected pinions meshing respectively with said sun gears, a stationary ring gear coaxial with said sun gears, and one or more idler planet pinions mounted in said planet carrier and meshing with said ring gear and with one of said sun gears.

2. A gear-set as set forth in claim 1 with the addition that the sun gear which meshes with the idler pinions is of larger diameter than the other sun gear.

3. A gear-set as set forth in claim 2 with the addition that the smaller sun gear is the driving element of the gear-set and the planet carrier is the driven element.

4. A gear-set as set forth in claim 1 with the addition of a central shaft arranged in supporting relationship with said planet carrier and rotatable relatively thereto, one of said sun gears being rigid with said shaft and the other being rotatably supported thereon.

5. A gear-set as set forth in claim 4, with the addition that said planet carrier comprises a pair of axially spaced side plates between which said sun gears are received, a bearing between each of said side plates and said shaft, a pin extending between said plates and rotatably supporting each planet cluster, and a pin extending between said plates and rotatably supporting each of said idler pinions.

6. A gear-set as set forth in claim 4 with the addition that the sun gear rigid with said shaft is the driving element of the gear set and the planet carrier is the driven element.

7. A gear-set as set forth in claim 1 with the addition that the idler pinions are coplanar with one of said sun gears and with the cluster-pinions meshing therewith.

References Cited in the file of this patent

UNITED STATES PATENTS 2,559,922    Alspaugh _____ July 10, 1951

FOREIGN PATENTS 624,313    Germany _____ Jan. 17, 1936